United States Patent [19]
Malla

[11] Patent Number: 5,843,861
[45] Date of Patent: Dec. 1, 1998

[54] PROCESS FOR THE SYNTHESIS OF KAOLIN CLAYS HAVING VARYING MORPHOLOGICAL PROPERTIES

[75] Inventor: Prakash B. Malla, Dublin, Ga.

[73] Assignee: Thiele Kaolin Company, Sandersville, Ga.

[21] Appl. No.: 779,964

[22] Filed: Dec. 23, 1996

[51] Int. Cl.⁶ .......................... C04B 14/04; C04B 33/04; C09C 1/42

[52] U.S. Cl. .......................... 501/146; 501/150; 106/486; 423/328.2; 423/118.1; 423/132

[58] Field of Search .............................. 106/486; 501/146, 501/150; 502/81, 83; 423/132, 328.2, 118.1

[56] References Cited

U.S. PATENT DOCUMENTS

| | | | |
|---|---|---|---|
| 2,296,637 | 9/1942 | Hanahan | 106/486 |
| 3,318,718 | 5/1967 | Beamesderfer et al. | 502/83 |
| 3,586,523 | 6/1971 | Fanselow et al. | |
| 3,617,215 | 11/1971 | Sugahari et al. | 502/81 |
| 4,812,299 | 3/1989 | Wason | |
| 4,816,074 | 3/1989 | Raythatha et al. | 501/146 |
| 4,952,388 | 8/1990 | Rittler | 501/146 |
| 5,082,815 | 1/1992 | Macedo | 502/83 |
| 5,089,056 | 2/1992 | Shi et al. | |
| 5,173,463 | 12/1992 | Macedo | 502/81 |
| 5,203,918 | 4/1993 | Rice | |
| 5,376,605 | 12/1994 | Iannicelli et al. | 106/486 |

OTHER PUBLICATIONS

DeKimpe et al.; *Low–Temperature Synthesis of Kaolin Materials*; 1964; American Mineralogist; vol. 49; pp. 1–16, (no month).

Eberl & Hower; *Kaolinite Synthesis: The Role of the Si–Al and (Alkali/H⁺) Ratio in Hydrothermal Systems*; 1975; Clays & Clay Minerals; vol. 23; pp. 301–309, (no month).

Tomura et al.; *Spherical Kaolinite: Synthesis and Mineralogical Properties*; 1983; Clays & Clay Minerals; vol. 31; pp. 413–421, (no month).

Miyawaki et al.; *Formation Process of Kaolinite from the Amorphous Mixture of Silica and Alumina*; 1992; Clay Science; vol. 8; pp. 273–284, (no month).

Satokawa et al.; *Effects of the Structure of Silica–Alumina Gel on the Hydrothermal Synthesis of Kaolinite*; 1994; Clays & Clay Minerals; vol.. 42; pp. 288–297, (no month).

*Primary Examiner*—Michael Marcheschi
*Attorney, Agent, or Firm*—Jones & Askew, LLP

[57] ABSTRACT

Substantially crystalline kaolin clays having varying morphological properties are produced by the hydrothermal treatment, in an acidic environment, of substantially amorphous calcined kaolin clay.

18 Claims, 11 Drawing Sheets

PROCESS FOR THE SYNTHESIS OF KAOLIN CLAYS HAVING VARYING MORPHOLOGICAL PROPERTIES

TECHNICAL FIELD

This invention relates to a process for the synthesis of kaolin clays having varying morphological properties. In a more specific aspect, this invention relates to a process for the conversion or transformation of the morphological properties of kaolin clay by the hydrothermal treatment of calcined kaolin clay in an acidic environment. This invention also relates to the kaolin clays which are produced by the process of this invention.

BACKGROUND OF THE INVENTION

Kaolin is a naturally occurring, relatively fine, white clay which may be generally described as a hydrated aluminum silicate. Kaolin clay is widely used as a filler and pigment in various materials, such as rubber and resins, and in various coatings, such as paints and coatings for paper.

The use of kaolin clay in coatings for paper serves, for example, to improve the opacity of the coated paper. Opacity in such paper coatings is enhanced by the light scattering ability of the kaolin clay.

Opacity is one of the most desirable optical properties of pigment coated paper and is directly related to the light scattering ability of a pigment. Light scattering ability of the pigment can be estimated by the light scattering coefficient using the Kubelka-Munk equation as described in TAPPI 1978, Vol. 61, No. 6, pp. 78–80.

Use of kaolin as a coating pigment for paper also improves other properties of the coated paper, such as brightness, color, gloss, smoothness, uniformity of appearance and printability. As a filler, kaolin is also used to extend fiber and reduce cost and to improve brightness and other desirable characteristics of the filled materials.

Calcined kaolin is a particular type of kaolin clay and is often used in large quantities for paper manufacture. Calcined kaolin can be obtained by heating kaolin clay at temperatures of at least 550° C. Calcined kaolin has improved light scattering characteristics (as compared to the non-calcined kaolin) and, therefore, contributes a higher degree of opacity to the paper coating.

From a general standpoint, the domestic kaolin clays of Georgia can be classified into two types—(1) hard, fine-grained Tertiary kaolin clays and (2) soft, coarse-grained Cretaceous kaolin clays. In some instances, kaolin clays exist which exhibit physico-chemical characteristics of both types.

The Middle Georgia coarse-grained (i.e., coarse particle size) Cretaceous kaolin is much less abundant than the East Georgia fine-grained (i.e., fine particle size) Tertiary kaolin. At the present rate of mining and consumption, depletion of the Middle Georgia coarse grained particle kaolin reserves is expected prior to depletion of the East Georgia fine particle kaolin reserves.

The Middle Georgia coarse-grained kaolin is more desirable for paper coating and filling applications than the East Georgia fine-grained kaolin. Therefore, a need exists to provide a process by which kaolin clay can be processed to control the morphology (i.e., the morphological properties) of the kaolin clay product. These changes in morphology will also result in changes in the physical properties of the kaolin clay product, such as changes in the viscosity, surface area, particle size and porosity of the kaolin clay product.

Many studies have been devoted to the experimental crystallization of kaolin because of its geological as well as industrial significance (DeKimpe et al., *American Mineralogist*, Vol. 49, pp. 1–16, 1964; Eberl and Hower, *Clays & Clay Minerals*. Vol. 23, pp. 301–309, 1975; Tomura et al., *Clays & Clay Minerals*, Vol. 31, pp. 413–421, 1983; Miyawaki et al., *Clay Science*, Vol. 8, pp. 273–284, 1992; Satokawa et al., *Clays & Clay Minerals*, Vol. 42, pp. 288–297, 1994). In most of these studies, kaolin was crystallized using separate sources of alumina and silica to form an aluminosilicate gel. The gel was then converted to kaolin either at low temperature and normal pressure or elevated temperature and pressure.

Normally, natural kaolins (kaolinites) are platy or pseudo hexagonal in morphology. However, kaolin particles of other morphology, such as spherical, lath or rod shapes, have been synthetically prepared. Tomura et al. (*Clays & Clay Minerals*, Vol. 31, pp. 413–421, 1983) describes the preparation of spherical kaolinite by hydrothermally treating a mixed sol of colloidal silica and alumina with a molar ratio of $Al_2O_3/SiO_2=0.5$. The mixed sol was spray dried and heated at 600° C. for 8 hours before hydrothermal treatment at 150°–350° C.

In more recent publications, Miyawaki (*Clay Science*, Vol. 8, pp. 288–297, 1994) and Satokawa et al. (*Clays & Clay Minerals*, Vol. 42, pp. 288–297, 1994) have described the preparation of spherical kaolin particles from amorphous mixtures of silica and alumina or silica-alumina gel, respectively. At slightly different conditions, Satokawa et al. have also prepared kaolin particles which have a hexagonal shape and which were <0.5 $\mu$m in dimension. These fine particles formed aggregates of 1–2 $\mu$m in size.

In the above processes, separate sources of alumina and silica were used to make the starting gel for kaolin crystallization, but these processes generally failed to produce kaolin with large plates and stacks similar to the coarse-grained Cretaceous Middle Georgia kaolin. Moreover, commercial production of kaolin from these sources could be expensive. Therefore, the industry needs a process which uses naturally available, abundant, inexpensive fine-grained kaolin to tailor-make kaolin clays of various morphologies, including large plates and spheres.

There are primarily two methods for producing aggregated or structured kaolin clay pigments: thermal and chemical. Thermally structured kaolin clays (also referred to as calcined clays) are produced by calcining the kaolin clay at temperatures of at least 550° C. Specific examples of calcined kaolin are described in Fanselow et al. U.S. Pat. No. 3,586,523.

Several methods have been used to produce chemically aggregated kaolin products. Shi et al. U.S. Pat. No. 5,089,056 discloses the production of chemically modified pigments by hydrothermally reacting kaolin clay with sodium and potassium hydroxides. In this system, the reactants are heated in a closed vessel at a temperature ranging from 150° to 200° C. The products are defined as extremely stable aggregates which incorporate light scattering sites.

Wason et al. U.S. Pat. No. 4,812,299 describes the production of synthetic alkali metal aluminosilicates by hydrothermally reacting kaolin clay with an alkali metal silicate. In this system, the pressure ranges from about 50 to 360 psig, and the temperature ranges from 140° to 250° C. The products after filtration and spray drying are identified as structured agglomerates formed from the integration of altered kaolin platelets with amorphous alkali metal silicate base-kaolin reaction products. These products are found to be useful as functional fillers, as TiO$_2$ and silica extenders, or as reinforcing agents for paper, paint, rubber and plastics.

Rice U.S. Pat. No. 5,203,918 discloses a room temperature process of forming an aggregated pigment from kaolin by intermixing the kaolin slurry with 10–20 percent alum by weight of kaolin and 15–30 percent sodium silicate, followed by filtering and drying the slurry. The products are reported to have coarser particle size distribution and higher pore volume compared to the starting feed and are useful in the coating and filling of papers.

In view of the foregoing discussion, there is a need in the industry for a process by which calcined kaolin clays can be processed so that the morphological properties of the kaolin clay product can be controlled to meet various product specifications.

SUMMARY OF THE INVENTION

Briefly described, the present invention provides a process for the hydrothermal treatment, in an acidic environment, of a calcined kaolin clay to produce a substantially crystalline kaolin clay product. More specifically, this invention provides a process in which fine-grained kaolin clays can be converted, under specific conditions, into substantially crystalline kaolin clays having morphological properties which are tailored to meet various product specifications.

In accordance with the present invention, the morphology of the substantially crystalline kaolin clay product will predominantly be (1) small and large plates which may be associated with stacks or books, (2) particles having a predominantly spherical shape, (3) blocky aggregates or (4) rosette-shaped aggregates.

The kaolin clay provided by this invention can be effectively used in those applications where naturally-occurring coarse-grained kaolin clay is currently used such as those applications where opacity and printability are desired features.

Accordingly, an object of this invention is to provide a process for the synthesis of kaolin clays having varying morphological properties.

Another object of this invention is to provide a process for the synthesis of kaolin clay particles having a structure comprised of small and large plates which may be associated with stacks or books.

Another object of the invention is to provide a process for the synthesis of kaolin clay particles having a predominately spherical shape.

Another object of the invention is to provide a process for the synthesis of kaolin clay which comprises blocky aggregates.

Still another object of this invention is to provide a process for the synthesis of kaolin clay which comprises rosette-shaped aggregates.

Another object of the invention is to provide a process for the synthesis of substantially crystalline kaolin clay from fine-grained kaolin clay.

Still another object of the invention is to provide a process for the synthesis of substantially crystalline kaolin clay from substantially amorphous calcined kaolin clay.

Still another object of the invention is to provide a process for the synthesis of substantially crystalline kaolin clay which can be used in applications where opacity and printability are desired features.

Still another object of this invention is to provide a substantially crystalline kaolin clay which is manufactured by the hydrothermal treatment of substantially amorphous calcined kaolin clay.

These and other objects, features, and advantages of this invention will become apparent from the following detailed description.

DETAILED DESCRIPTION OF THE INVENTION

The products of this invention have a higher degree of crystallinity or degree of order as indicated by a higher Hinkley Index which can be measured from the x-ray powder diffraction patterns as described in *Clays & Clays Minerals,* Proceedings of the 11th National Conference, Pergamon Press, pp. 299–235, 1963.

The fine particle kaolin can be calcined at temperatures which are well known in the industry, with the preferred range being from 600°–1100° C. Below dehydroxylation and beyond 1100° C., the reactivity of the calcined kaolin clay for crystallization may diminish significantly. As set forth in this application, the process for calcination of kaolin clay is conventional in this industry.

The hydrothermal crystallization provided by this invention is preferably performed in a closed vessel at 150°–350° C., preferably at 200°–250° C.

The solids content of the reaction slurry can be varied from 1 to 50 percent, preferably 10 to 20 percent, by weight. The concentration of the acid can be varied from 0.00001M to 2.0M (molar), preferably 0.01 to 0.5M. The duration of reaction can be varied from 1 to 20 days, preferably 3 to 10 days.

Examples of acids which can be effectively used to provide the acidic media for this invention are hydrochloric, nitric, sulfuric, phosphoric, citric and acetic and mixtures thereof.

Figure 1:
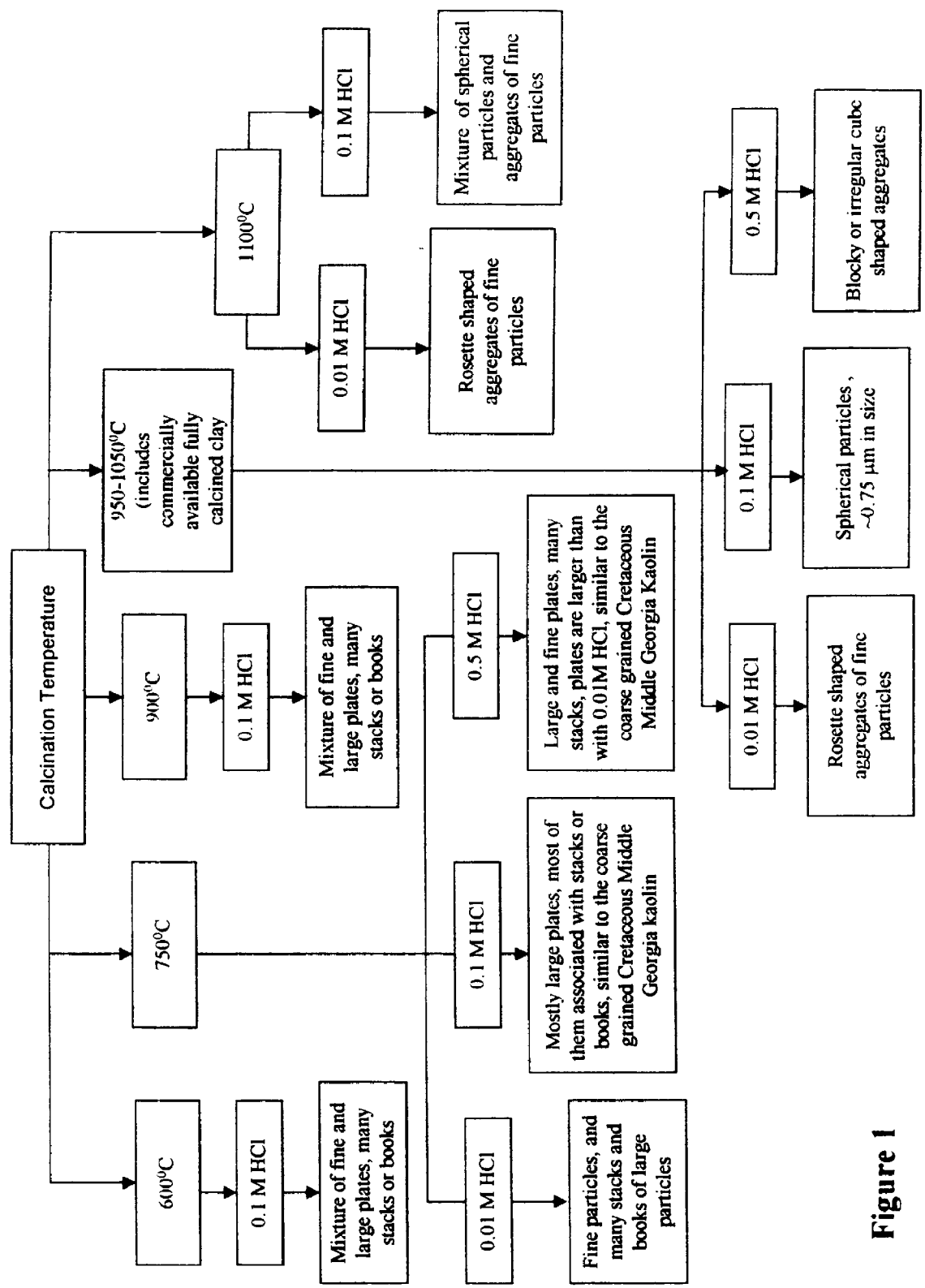
FIG. 1 shows the evolution of various morphologies of kaolin clays as a function of synthesis conditions.

The calcined kaolin clay which is the starting feed material for this process may be derived from any coarse-grained or fine-grained kaolin clay. As shown in FIG. 1 the temperature employed in the calcination process and the acidic conditions used in the process of this invention will primarily determine the morphology of the substantially crystalline kaolin clay product.

Calcined kaolin clay which is treated by the process of this invention, under the acidic environment shown in FIG. 1, will predominantly have the following morphologies:

| Calcination Temperature °C. | Morphology of Product |
| --- | --- |
| 600 | mixture of small and large plates |
| 750 | large plates |
| 900 | mixture of small and large plates |
| 1000–1050 | rosette-shaped, spherical-shaped or blocky aggregates |
| 1100 | rosette-shaped, aggregates of fine particles or mixture of spherical-shaped particles and aggregates of fine particles |

In these temperature ranges and acid conditions, there may be some overlap with regard to morphological properties.

The present invention is further illustrated by the following examples which are illustrative of certain embodiments designed to teach those of ordinary skill in the art how to practice this invention and to represent the best mode contemplated for practicing this invention.

EXAMPLE I

Figure 2:
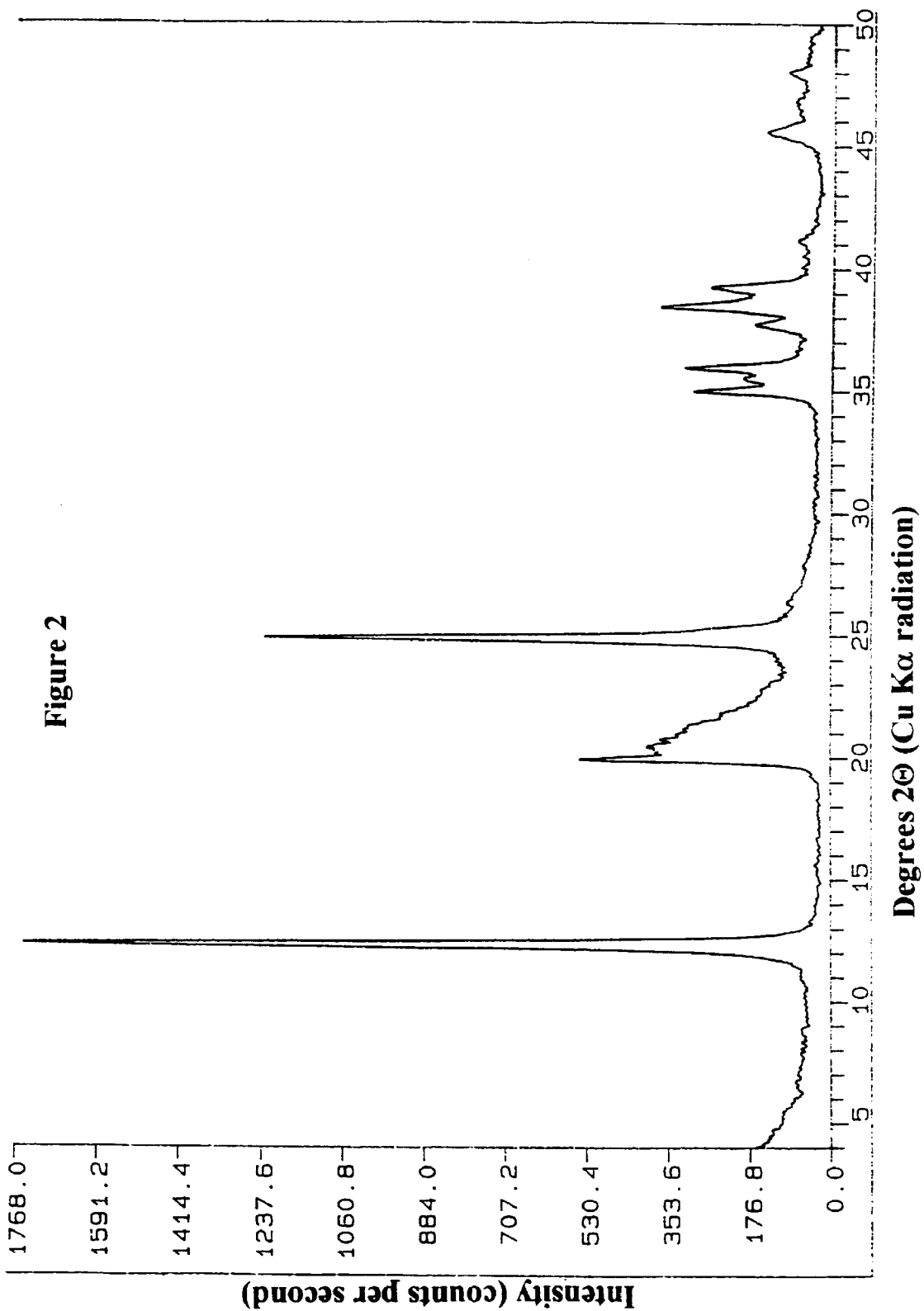
FIG. 2 shows the x-ray powder diffraction pattern of the fine particle Tertiary kaolin used as feed for calcination in Example I.
Figure 3:
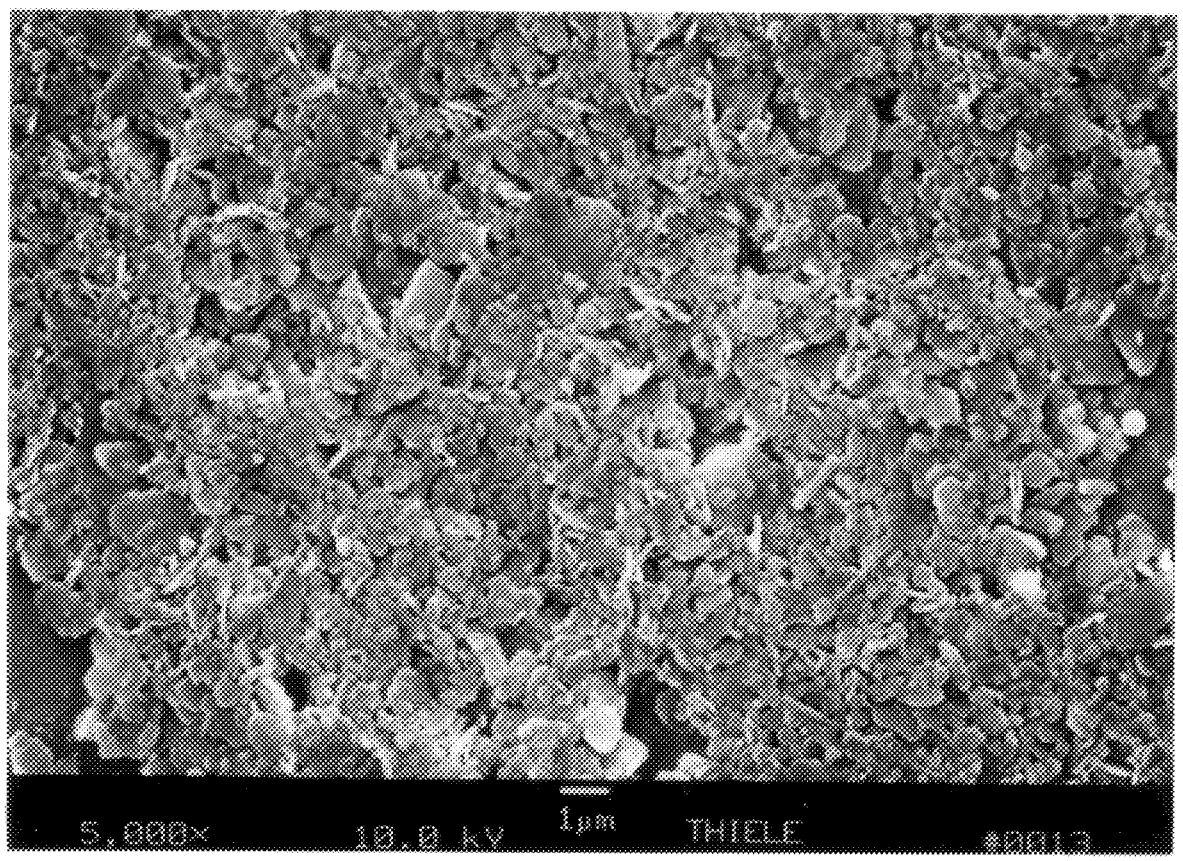
FIG. 3 shows the scanning electron micrograph of the kaolin described in FIG. 2.

A fine particle Tertiary kaolin clay is classified to 99.1 percent <2 $\mu$m, and used as feed for calcination. The Tertiary kaolin is a poorly ordered kaolin as indicated by poorly defined x-ray diffraction peaks (FIG. 2) between 19 and 24 degrees two theta and a very low Hinkley Index (0.19). The fine particles are evident in the scanning electron micrograph (SEM) shown in FIG. 3. A thermogravimetric analysis indicates that this product loses 13.6 percent structural water which can be equated to 98 percent pure kaolinite as compared with an ideal pure kaolinite in which the amount of structural water is 13.95 percent.

EXAMPLE II

The fine particle Tertiary kaolin described in Example I is calcined at 750° C. for 2 hours in a muffle furnace. The calcined sample is double pulverized in a laboratory Hammer mill and used for subsequent hydrothermal crystallization reactions. During calcination, the kaolin loses its structural water, and consequently also loses its crystal integrity.

EXAMPLE III

Four 9 gram samples of the kaolin from Example 2 are each suspended in 81.5 g of 0.1M hydrochloric acid solution in a 125 ml Teflon-lined stainless steel Parr reactor. The slurry is homogenized with a spatula, and the reactors are heated in a oven at 220° C. for 10 days. At the end of the 10th day, the reactor are removed from the oven and cooled to room temperature. The solid product is washed and separated from the liquid by centrifugation. The product is then dried at 105° C. and characterized.

Figure 4:
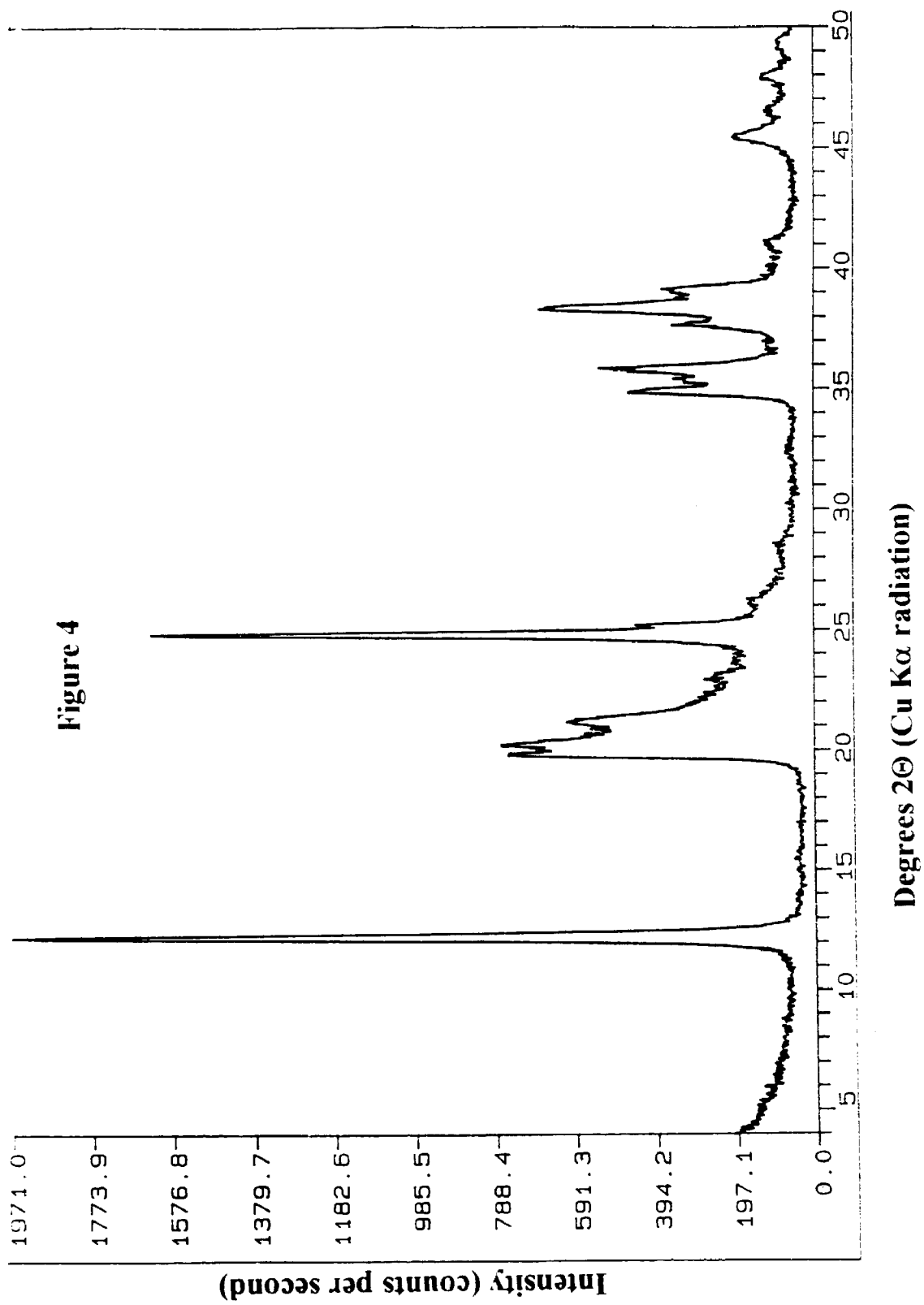
FIG. 4 shows the x-ray powder diffraction pattern of the product described in Example III.
Figure 5:
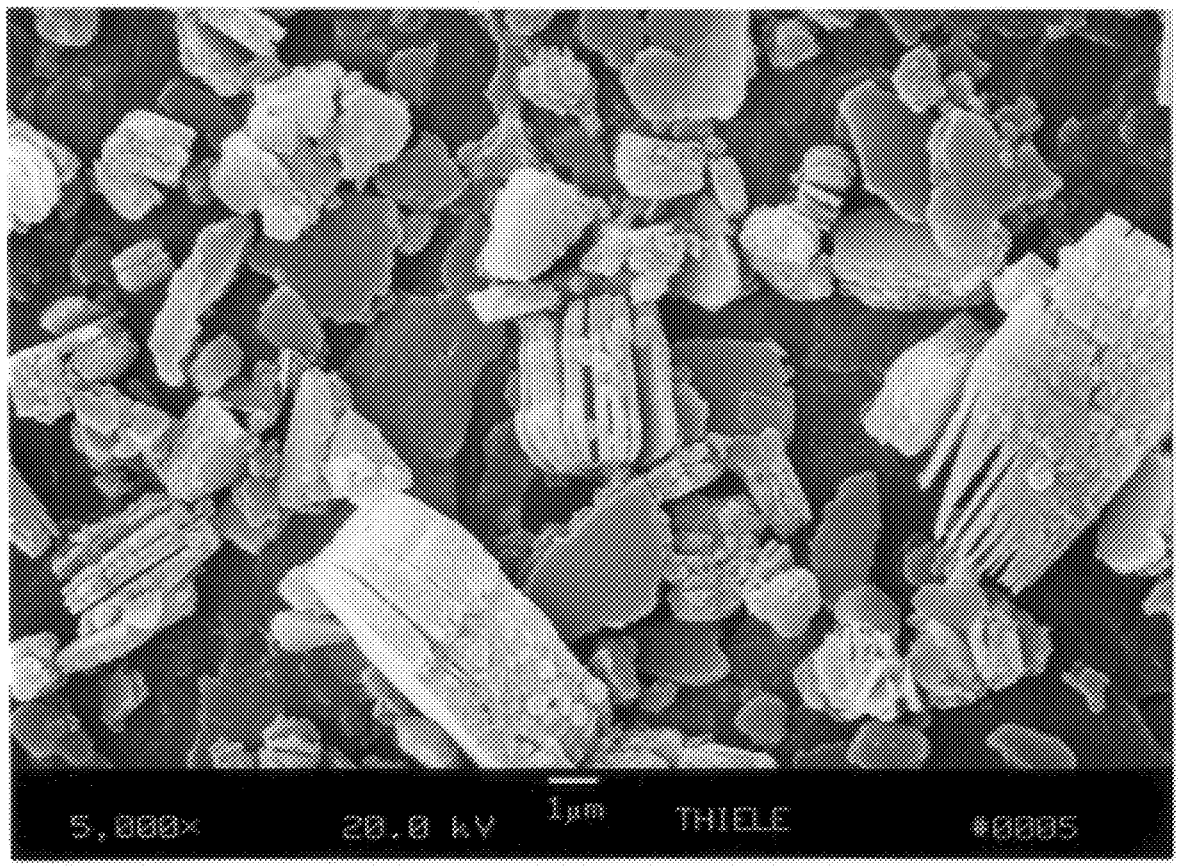
FIG. 5 shows the scanning electron micrograph of the product described in Example III.

The x-ray powder diffraction pattern (FIG. 4) and differential thermal analysis indicate that the product is essentially a kaolin clay. The Hinkley Index of the product is 0.40 which is higher than that for the starting Tertiary clay. The SEM of FIG. 5 clearly show that a large particle, platy kaolin similar to a coarse-grained Cretaceous Middle Georgia kaolin has been crystallized. Thermal gravimetric analysis indicates that the crystalline kaolin product contains 97 percent kaolin.

EXAMPLE IV

The procedure of Example III is followed, but the reactions are carried out for 3 days. The amount of kaolin crystallized is 96 percent.

EXAMPLE V

The procedure of Example III is followed, but 0.01M concentrations of HC1 are used. The crystalline kaolin product consists of a mixture of fine particles and books or stacks of large particles.

EXAMPLE VI

The procedure of Example III is followed, but 0.5M concentrations of HC1 are used. The crystalline kaolin product consists of a mixture of large and fine plates, together with many stacks or books.

EXAMPLE VII

The procedure of Example III is followed, but the kaolin is calcined at 600° C. before crystallization. The crystalline kaolin product is ordered with a Hinkley Index of 0.65 and consists of both coarse and fine-grained kaolin particles with numerous stacks.

EXAMPLE VIII

The procedure of Example III is followed, but the kaolin is calcined at 900° C. before crystallization. The crystalline kaolin product is ordered with a Hinkley Index of 0.76 and consists of both coarse and fine-grained kaolin particles with numerous stacks.

EXAMPLE IX

The procedure of Example III is followed, but the kaolin is calcined at 1050° C. before crystallization. The crystalline kaolin product is more ordered (Hinkley Index of 0.49) than the starting Tertiary clay and consists of spherical kaolin particles of about 0.75 $\mu$m.

EXAMPLE X

The procedure of Example IX is followed, but the concentration of HC1 used is 0.01. The crystalline kaolin product is well ordered with a Hinkley Index of 1.07 and consists of aggregates of very fine kaolin particles.

EXAMPLE XI

KAOCAL is a commercial calcined kaolin clay from Thiele Kaolin Company, Sandersville, Ga. This product is used as the starting material for the reactions described in Examples XII–XVI.

EXAMPLE XII

Figure 6:
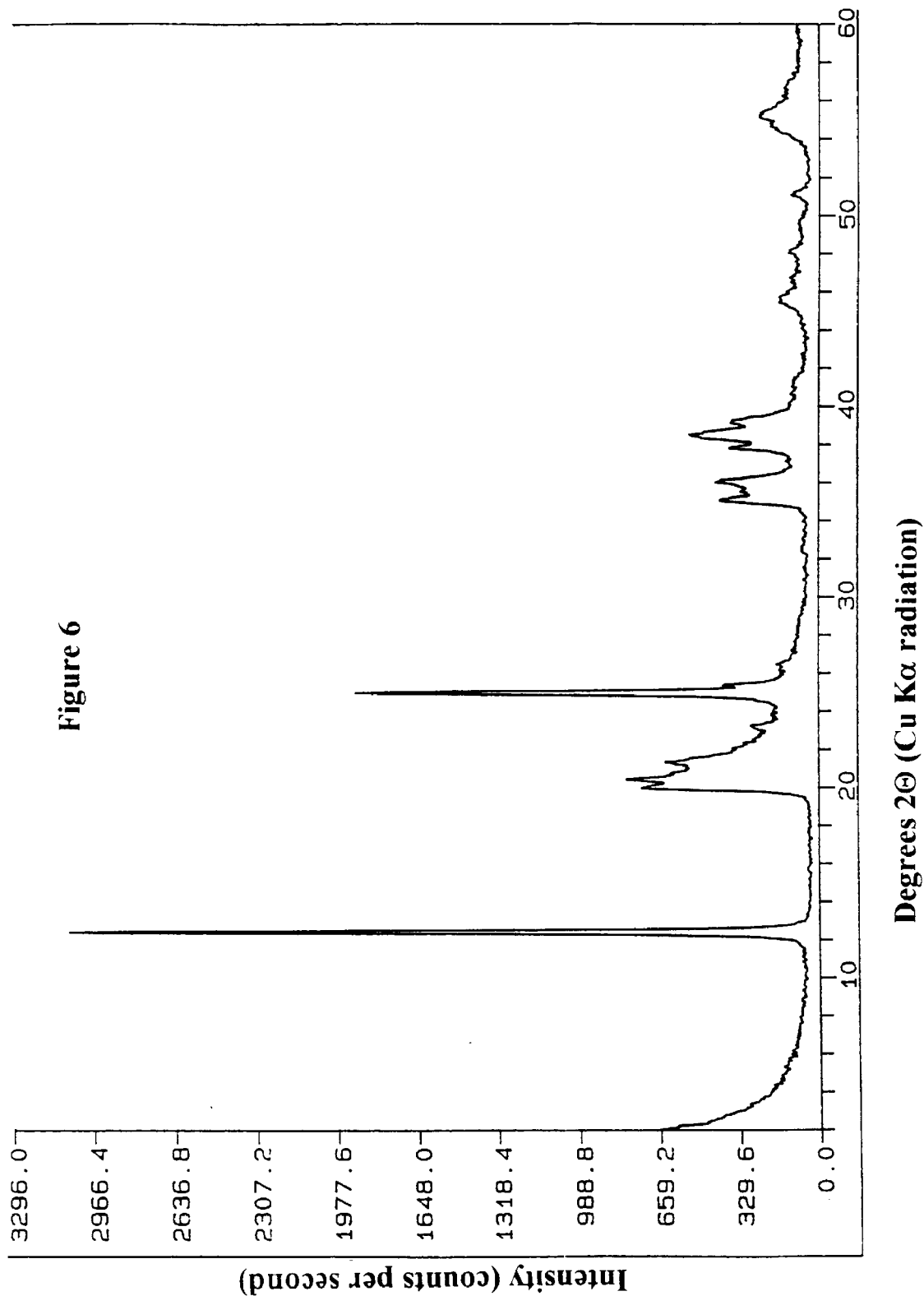
FIG. 6 shows the x-ray powder diffraction pattern of the product described in Example XII.
Figure 7:
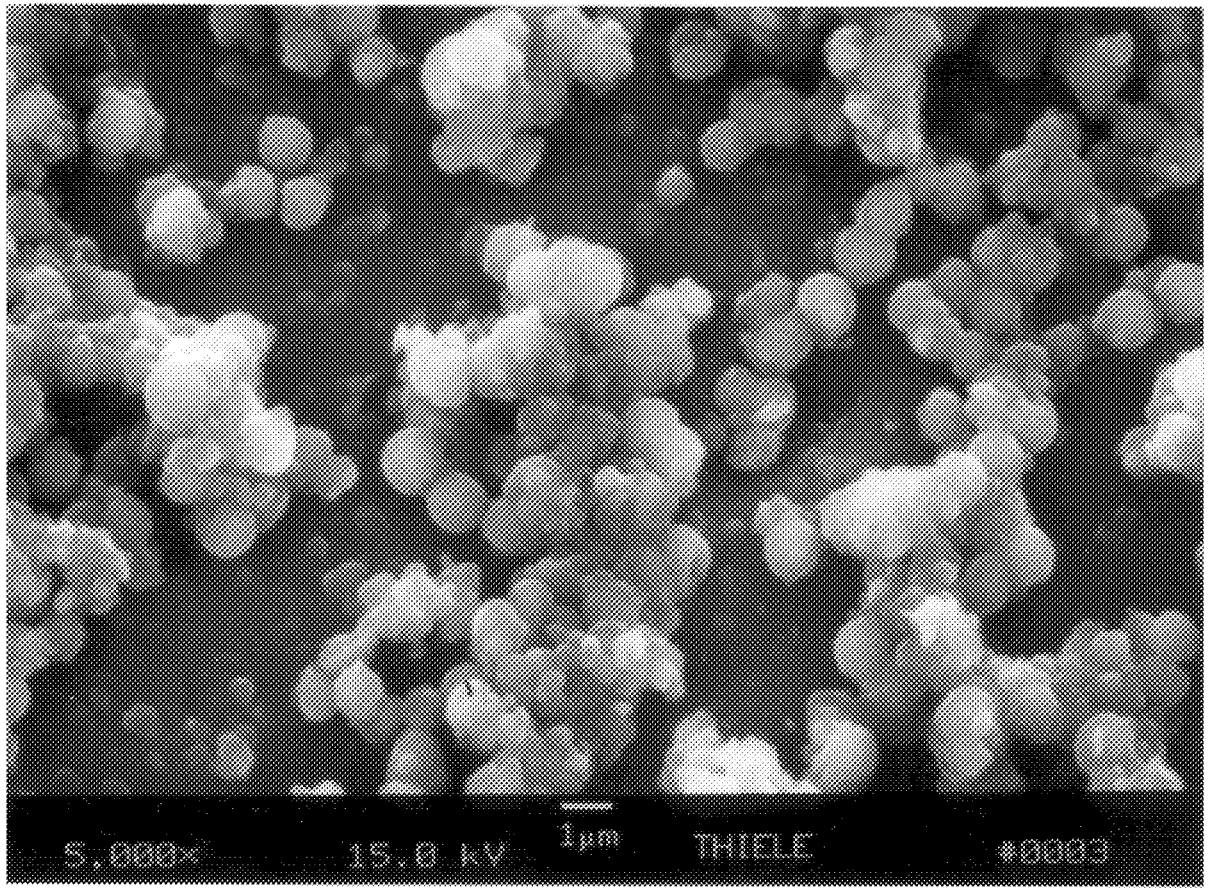
FIG. 7 shows the scanning electron micrograph of the product described in Example XII.

The procedure of Example III is followed, but the starting feed used is the commercial calcined clay described in Example XI. The product consists predominately of spherical particles as shown in the x-ray powder diffraction pattern of FIG. 6 and the SEM of FIG. 7.

EXAMPLE XIII

The procedure of Example XII is followed, but the reaction is carried out for 7 days. The amount of kaolin crystallized is 91 percent.

EXAMPLE XIV

The procedure of Example XII is followed, but the reaction is carried out for 5 days. The amount of kaolin crystallized is 52 percent.

EXAMPLE XV

Figure 8:
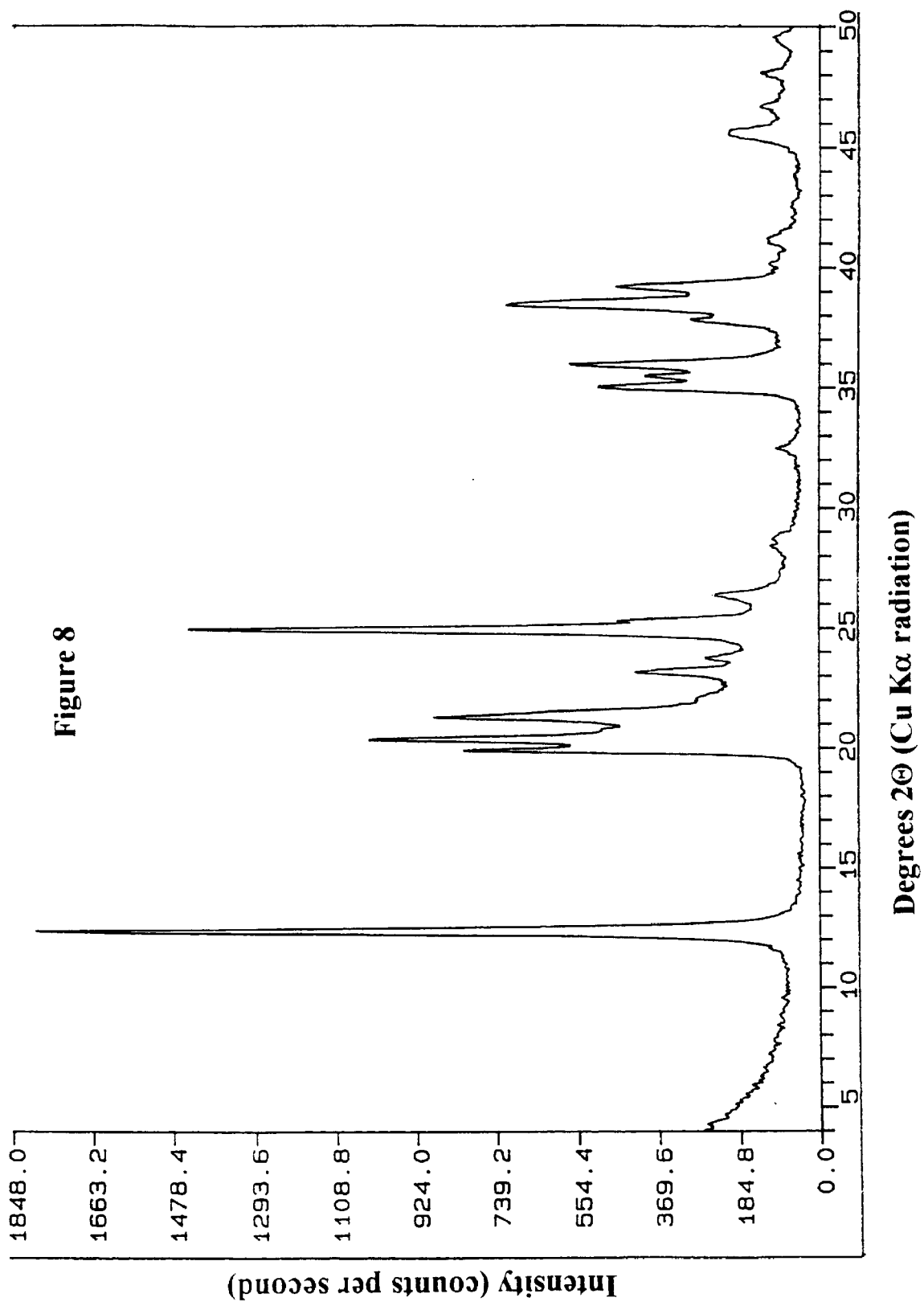
FIG. 8 shows the x-ray powder diffraction pattern of the product described in Example XV.
Figure 9:
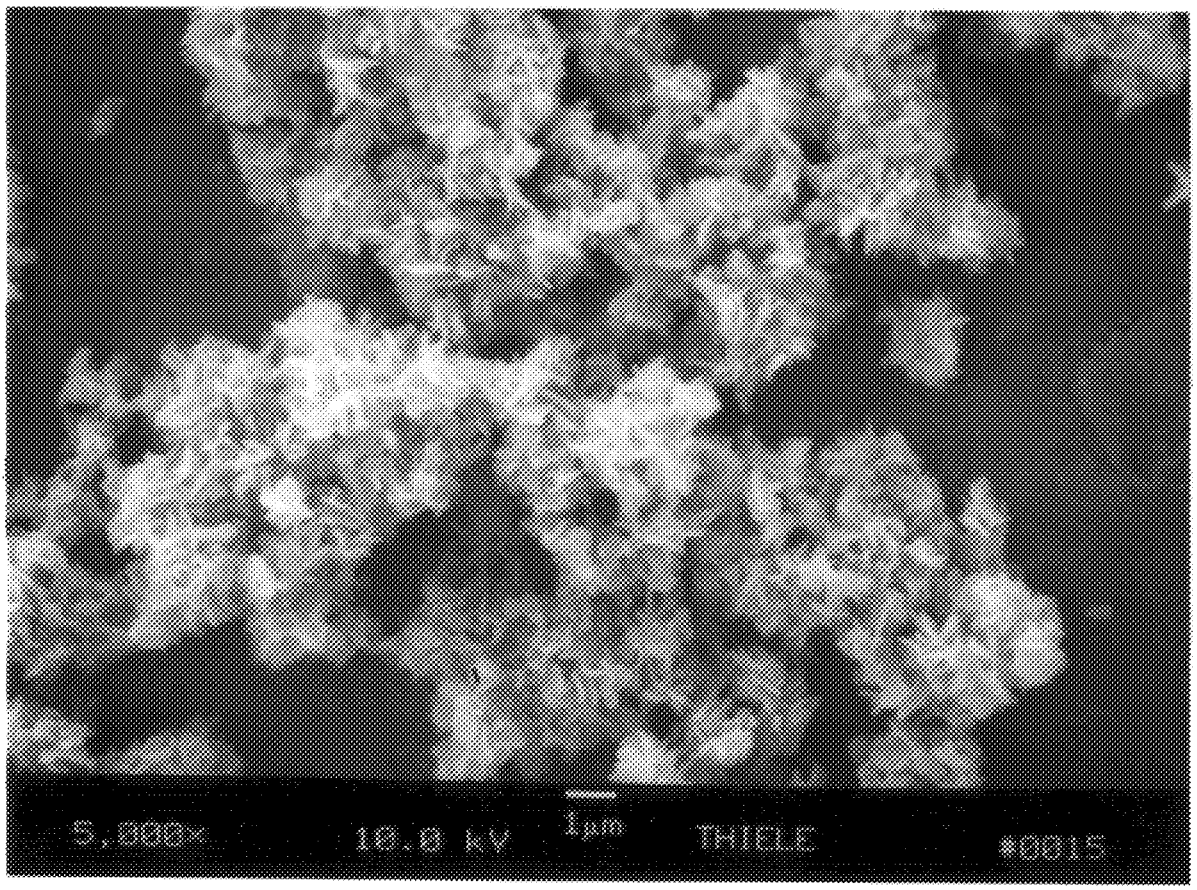
FIG. 9 shows the scanning electron micrograph of the product described in Example XV.

The procedure of Example XII is followed, but the concentration of HC1 used is 0.01. The crystalline kaolin product consists of rose-shaped aggregates of fine plates as shown in the x-ray powder diffraction pattern of FIG. 8 and the SEM of FIG. 9.

EXAMPLE XVI

Figure 10:
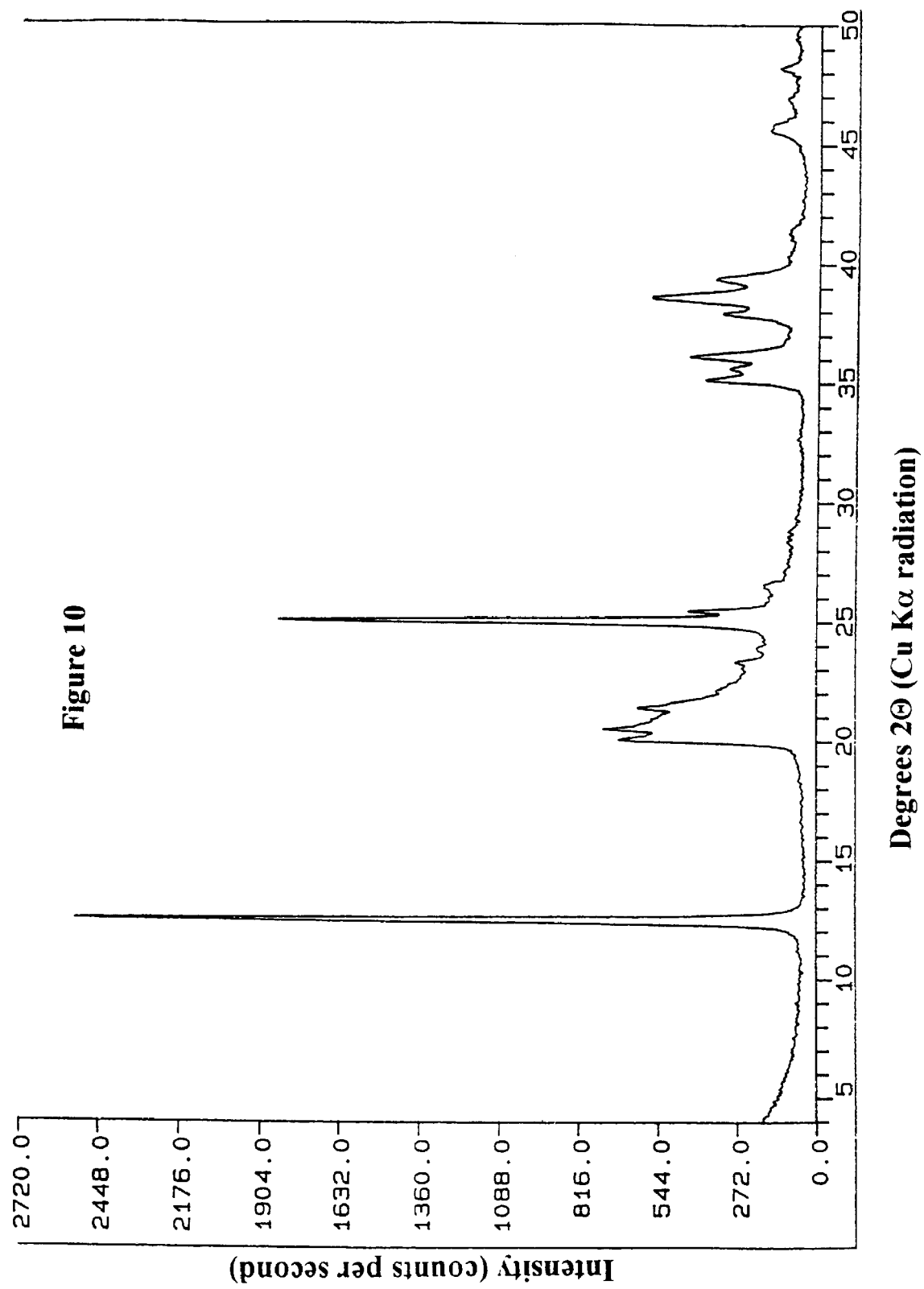
FIG. 10 shows the x-ray powder diffraction pattern of the product described in Example XVI.
Figure 11:
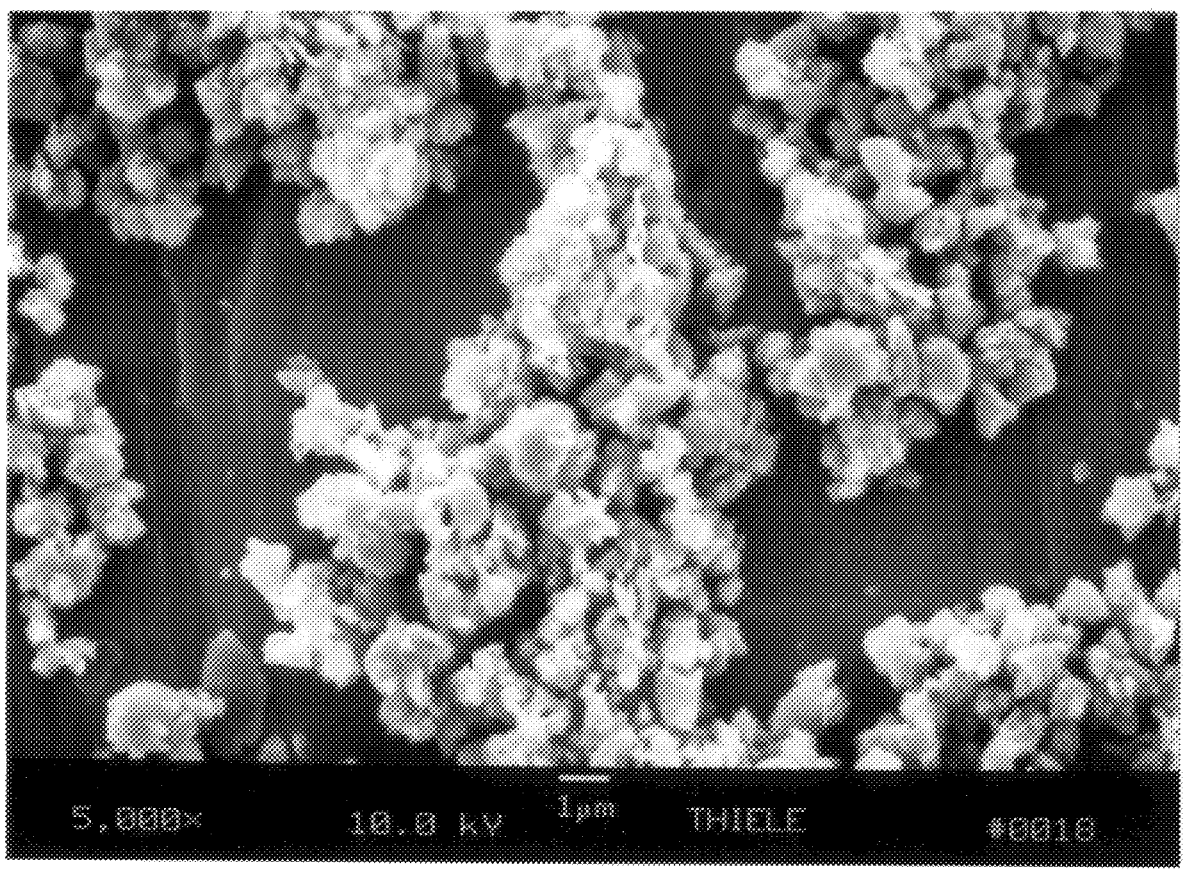
FIG. 11 shows the scanning electron micrograph of the product described in Example XVI.

The procedure of Example XII is followed, but the concentration of HC1 used is 0.5. The crystalline kaolin product consists of blocky or irregular cube-shaped aggregates as shown in the x-ray powder diffraction pattern of FIG. 10 and the SEM of FIG. 11.

The pertinent data (percent kaolinite, morphology, Hinkley Index, degree of order and total pore volume) from the above examples are summarized in Tables I and II.

TABLE I

| Example | % Kaolinite* | Morphology | HI | Degree of Order | Total Pore Volume (ml/g) |
|---|---|---|---|---|---|
| I | 98 | fine grained | 0.19 | poorly ordered | 0.341 |
| II | 0 | aggregated | NA | amorphous | 0.713 |
| III | 97 | coarse grained, platy | 0.40 | ordered | 0.348 |
| IV | 96 | coarse + fine grained | ND | ordered | 0.303 |
| V | ND | fine + coarse grained, platy | 0.35 | ordered | 0.348 |
| VI | ND | coarse grained, platy, slightly aggregated | 0.81 | well ordered | 0.422 |

HI = Hinkley Index
NA = not applicable
ND = not determined
*The percent kaolinite is determined by thermogravimetric analysis.

TABLE II

| Example | % Kaolinite* | Morphology | HI | Degree of Order | Total Pore Volume (ml/g) |
|---|---|---|---|---|---|
| I | 98 | fine grained | 0.19 | poorly ordered | 0.341 |
| XI | 0 | aggregated | NA | amorphous | 1.175 |
| XII | 93 | spherical | ND | ordered | 0.317 |
| XV | 95 | rosette, aggregated | 1.0 | well ordered | 1.276 |
| XVI | 88 | blocky, aggregated | 0.57 | ordered | 0.746 |

HI = Hinkley Index
NA = not applicable
ND = not determined
*The percent kaolinite is determined by thermogravimetric analysis.

This invention has been described in detail with particular reference to certain embodiments, but variations and modifications can be made without departing from the spirit and scope of the invention as defined in the following claims.

What is claimed is:

1. A process for the synthesis of a crystalline kaolin clay, wherein the process comprises the sequential steps of:

(a) placing a amorphous calcined kaolin clay into a vessel which contains an acidic media;

(b) mixing the contents of the vessel at a temperature within the range of about 150° to about 350° C., for a time period of about 1 to about 20 days, to obtain a homogeneous slurry having a solids content of about 1 to about 50 percent by weight; and (c) cooling the slurry.

2. A process as defined by claim 1 wherein the amorphous calcined kaolin clay is produced from a coarse-grained kaolin clay.

3. A process as defined by claim 1 wherein the amorphous calcined kaolin clay is produced from a fine-grained kaolin clay.

4. A process as defined by claim 1 wherein the acidic media has a molarity of from 0.00001 to about 2.0.

5. A process as defined by claim 1 wherein the acidic media has a molarity of from 0.01 to about 0.5.

6. A process as defined by claim 1 wherein the acidic media comprises hydrochloric nitric, sulfuric, phosphoric, citric or acetic acid or mixtures thereof.

7. A process as defined by claim 1 wherein the contents of the vessel are mixed at a temperature within the range of about 200° to about 250° C.

8. A process as defined by claim 1 wherein the mixing occurs for a time period of about 3 to about 10 days.

9. A process as defined by claim 1 wherein the slurry has a solids content of about 10 to about 20 percent by weight.

10. A crystalline kaolin clay synthesized by a process which comprises the sequential steps of:

(a) placing a amorphous calcined kaolin clay into a vessel which contains an acidic media;

(b) mixing the contents of the vessel at a temperature within the range of about 150° to about 350° C., for a time period of about 1 to about 20 days, to obtain a homogeneous slurry having a solids content of about 1 to about 50 percent by weight; and (c) cooling the slurry.

11. A crystalline kaolin clay as defined by claim 10 wherein the amorphous calcined kaolin clay is produced from a coarse-grained kaolin clay.

12. A crystalline kaolin clay as defined by claim 10 wherein the amorphous calcined kaolin clay is produced from a fine-grained kaolin clay.

13. A crystalline kaolin clay as defined by claim 10 wherein the acidic media has a molarity of from 0.0001 to about 2.0.

14. A crystalline kaolin clay as defined by claim 10 wherein the acidic media has a molarity of from 0.01 to about 0.5.

15. A crystalline kaolin clay as defined by claim 10 wherein the acidic media comprises hydrochloric, nitric, sulfuric, phosphoric, citric or acetic acid or mixtures thereof.

16. A crystalline kaolin clay as defined by claim 10 wherein the contents of the vessel are mixed at a temperature within the range of about 200° to about 250° C.

17. A crystalline kaolin clay as defined by claim 10 wherein the mixing occurs for a time period of about 3 to about 10 days.

18. A crystalline kaolin clay as defined by claim 10 wherein the slurry has a solids content of about 10 to about 20 percent by weight.

* * * * *